J. C. HOOPER & A. W. BRATT.
HOSE PIPE COUPLING.
APPLICATION FILED DEC. 5, 1908.
926,415.
Patented June 29, 1909.
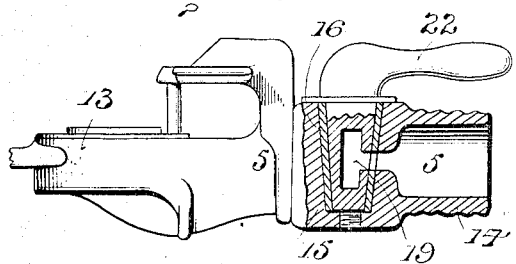
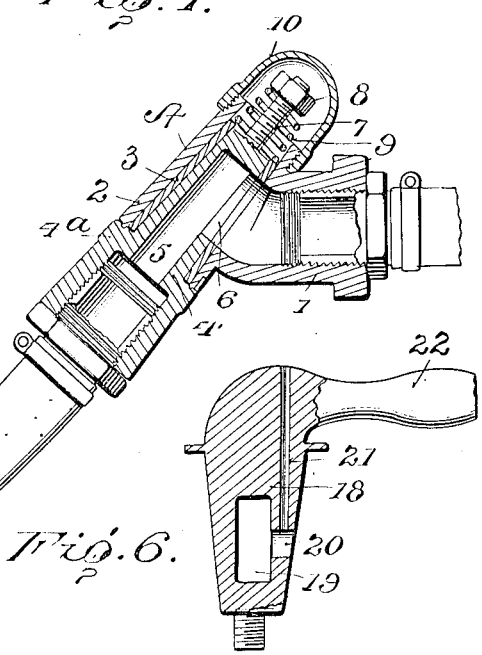
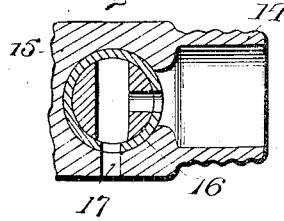
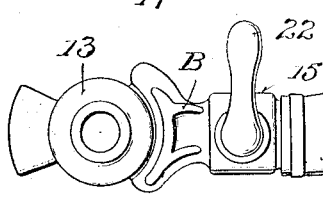
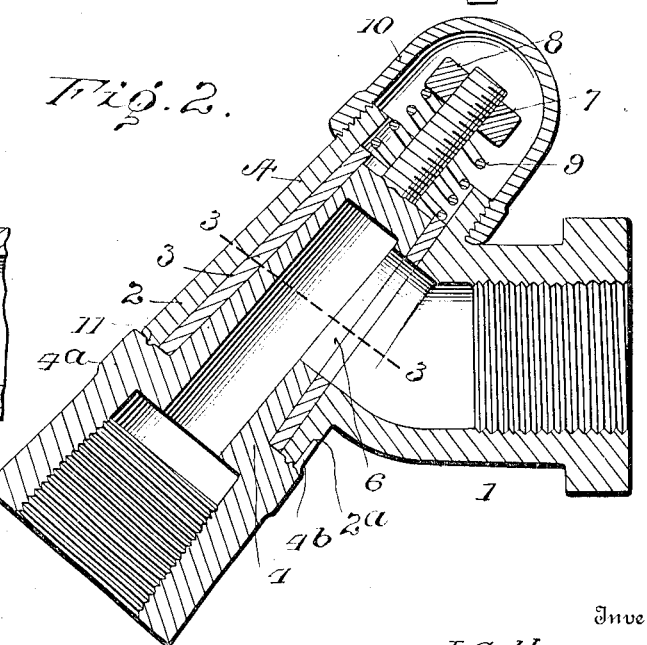
Inventors:
J. C. Hooper
A. W. Bratt

UNITED STATES PATENT OFFICE.

JOHN C. HOOPER AND ARTHUR W. BRATT, OF BRUNSWICK, MARYLAND, ASSIGNORS OF ONE-THIRD TO ANDREW KNELL, JR., OF BALTIMORE, MARYLAND.

HOSE-PIPE COUPLING.

No. 926,415.            Specification of Letters Patent.            Patented June 29, 1909.

Application filed December 5, 1908. Serial No. 466,132.

*To all whom it may concern:*

Be it known that we, JOHN C. HOOPER and ARTHUR W. BRATT, citizens of the United States, both residing at Brunswick, in the county of Frederick and State of Maryland, have invented certain new and useful Improvements in Hose-Pipe Couplings, of which the following is a specification.

This invention contemplates certain new and useful improvements in fluid pressure brake systems, and relates particularly to improved safety appliances for train pipe couplings.

To those versed in the art to which this invention appertains, it is well known that trainmen, in the act of uncoupling cars, manipulate the car coupling releasing lever after they have turned the angle cocks to closed position, without disconnecting the hose pipe couplers before giving the engineer the signal to go ahead. This manifestly stretches the hose pipes, which results in their permanent injury as a consequence, owing to the fact that they are thereby split and rendered liable to leak.

The primary object of the present invention is to avoid the contingency above mentioned by the provision of safety means rendering it impossible to shut off the angle cocks without at the same time, disconnecting the hose couplers. And a further object of the invention is an improved means for venting the train pipe prior to the disconnecting of the couplers so as to effect an application of the brakes before the hose couplers are disconnected, whereby the operation of disconnecting the couplers is rendered safe and the accidents which have frequently occurred by the disconnecting of hose couplers with the train pipe at standard pressure, effectually avoided.

With these and other objects in view as will more fully appear as the description proceeds, the invention consists in certain constructions, arrangements, and combinations of the parts that we shall hereinafter fully describe and claim.

For a full understanding of the invention, reference is to be had to the following description and accompanying drawings in which:

Figure 1 is a side elevation with parts in section of a hose pipe constructed in accordance with our invention; Fig. 2 is an enlarged sectional view of the angle cock; Fig. 3 is an enlarged sectional view thereof, the section being taken on the line 3—3 of Fig. 2; Fig. 4 is a side elevation of our improved hose-pipe-couplers, a part being shown in section; Fig. 5 is a horizontal sectional view through a portion of the coupler; and, Fig. 6 is a detail view of the plug valve for the coupler shown partly in section.

Corresponding and like parts are referred to in the following description and indicated in all the views of the accompanying drawings, by the same reference characters.

Referring to the drawings, the letter A designates our improved construction of angle cock, which is formed with the usual hexagonal attaching nipple 1, interiorly threaded as shown, and which is also formed with the obliquely disposed case or barrel 2 which communicates with the interior of the nipple 1 and preferably contains a brass or similar bushing 3, the said valve case 2, and bushing 3 being tapered as clearly illustrated in the drawing.

4 designates the plug of the angle cock which is hollow as shown, containing a longitudinally extending opening 5 and one or more ports 6 designed to control the communication between the interior of the nipple 1 and the interior of the plug. The plug 4 is tapered so as to accurately fit the interior of the bushing 3, and is provided at one end with a threaded stem 7 on which a nut 8 screws. An expansion spring 9 is coiled around said stem and presses against the nut and the adjacent end of the bushing 3, so as to have a tendency to securely hold the plug 4 to its seat within the bushing 3. Preferably a cap 10 is screwed or otherwise secured to the upper end of the case 2 so as to inclose the stem 7, nut 8 and spring 9 to prevent them from being interfered with by dirt or the like. Between the lower end of the case 2 and the corresponding shoulder portion 4$^a$ of the plug, we preferably provide a gasket or packing 11. The shoulder portion 4$^a$ of the plug is preferably of hexagon or similar shape, so that a tool may be conveniently applied thereto to turn the plug, although it is to be understood the plug may be turned by the trainman's hands directly applied to the lower projecting end of the plug or to the hose pipe 12 which is screwed thereon, the lower end of the plug being interiorly threaded to receive a union or the like so as to secure the hose pipe to the plug.

From this preceding portion of the specification, in connection with the accompanying drawings, it is evident that in the operation of our improved hose pipe coupling and angle cock, the operation of turning the plug 4 to close the cock will be accompanied necessarily by a twisting movement of the hose pipe with the result that as the cocks are closed against the passage of air, the hose pipe couplings are thus automatically disconnected from each other. Hence, with our construction of apparatus, it will be impossible for the trainmen to close the angle cock without disconnecting the hose pipe couplers, the splitting and consequent injury to the hose pipes, as before set forth being thereby effectually prevented.

In addition to the above described construction and arrangement of parts, our invention embodies as set forth in the specification, simple, durable and efficient means whereby the train pipe may be properly vented before closing the angle cocks and disconnecting the hose pipe couplers. This portion of the invention we shall now describe.

Referring particularly to Fig. 1, the letter B designates one of our improved hose pipe couplers which may be provided with any of the conventional or desired forms of jaws 13 and shank 14, the latter being intended for connection with the hose pipe in the usual manner. In the present embodiment of the invention the hose connection or shank 14 is set off or separated from the jaw portion, and between the two the said coupler embodies a valve casing 15 preferably bushed as indicated at 16 and formed with a lateral vent 17 leading to the atmosphere. A plug valve 18 is mounted in the casing 15 to turn therein about its longitudinal axis. The said plug is formed with a straight way opening 19, and with a vent groove or opening 20. The said valve may also be formed with a leakage groove 21, and it has a handle 22 so that it may be easily turned. In the normally connected position of the parts, the plug 18 is turned to provide a straightway passage through the coupler. Whenever it is desired to disconnect the couplers, the said valve is so turned that air may pass through the ports 19 and port 20 through the port 17 to the atmosphere and thereby vent the train pipe before the couplers are disconnected. It will thus be seen that we have here provided an additional means of safety, which will prevent, if properly used, those occurrences which have resulted sometimes in serious injuries to the trainmen, when attempting to uncouple the hose pipes with the train pipes at standard pressure thereby securing an emergency application of the brakes and receiving the full force of air into the flexible hose pipe and the relatively heavy metal couplers on the free ends thereof.

Preferably as illustrated in Fig. 2, the plug 4 is formed with a lug $4^b$ working in a slot $2^a$ in the lower end of the casing 2, so as to limit the movement of the plug in either direction.

Having thus described the invention, what is claimed as new is:

1. An angle cock, embodying a casing and a plug mounted to turn therein, said plug being arranged for the connection of a hose pipe thereto.

2. An angle cock, embodying a casing, and a plug mounted to turn is said casing and controlling the passage therethrough, the plug projecting out of the casing at one end, and formed at such end for the connection of a hose pipe thereto.

3. In a hose pipe coupler, the combination with hose pipes, of couplers connected to said hose pipes at one end thereof, plugs connected to the opposite ends of the hose pipes, and angle cock casings in which said plugs are mounted to turn about their longitudinal axes, the plugs controlling the passage of fluid pressure through the hose pipes.

4. An angle cock, comprising a nipple, a casing connected therewith and obliquely disposed thereto, a plug mounted to turn in said casing, the plug controlling the passage of air through the casing, and the projecting end of the plug being formed for the attachment of a hose pipe thereto.

5. An angle cock, embodying a body portion comprising a nipple, and a tapered casing, a tapered plug mounted in said casing and arranged to control the passage of fluid pressure through the body portion, the plug being formed with a threaded stem, a nut screwing on said stem, a spring encircling said stem and bearing against the nut and against the body portion, and a cap screwed to said body portion and inclosing the nut and spring and stem, the plug being formed at one end for the attachment of a hose pipe thereto.

6. In a hose pipe coupler, the combination with a train line, of a valve casing secured thereto, and a valve mounted in said casing and controlling the opening through the casing, the valve being arranged for the connection of a hose pipe thereto and being adapted for actuation in the operation of opening the train line by pipe and upon the turning movement of the hose pipe in a direction to disconnect the coupler thereof.

In testimony whereof we affix our signatures in presence of two witnesses.

JOHN C. HOOPER. [L. S.]
ARTHUR W. BRATT. [L. S.]

Witnesses:
W. J. CORBETT,
CHAS. R. GREGORY.